Aug. 10, 1954

W. W. ODELL 2,686,113

PROCESS OF PROMOTING CHEMICAL REACTIONS

Filed May 13, 1949

William W. Odell
Inventor

Patented Aug. 10, 1954

2,686,113

UNITED STATES PATENT OFFICE 2,686,113

PROCESS OF PROMOTING CHEMICAL REACTIONS

William W. Odell, New York, N. Y.

Application May 13, 1949, Serial No. 93,132

23 Claims. (Cl. 48—206)

This invention relates to process of promoting chemical reactions. It has to do with the production of combustible gas by passing a fluid stream initially containing gas-making materials through and in contact with a deep bed of small-size solids which solids are at a gas making temperature. In particular it deals with gasification of carbonaceous solid fuels in a fine state of subdivision by incompletely oxidizing them in a fluid stream initially containing an oxidizing agent, as the steam passes over a mobile tortuous course at a predetermined and controlled velocity upwardly through a bed of hot contact solids confined in a generator. Still more specifically, the invention relates to the production of a gas containing appreciable amounts of $H_2$ and $CO$.

In present practice in making combustible gas using powdered or small-size solid fuel, difficulties have been experienced not only as to clinkering of the ash and adhesion of slagged ash to the generator wall and refractory offtake linings but also because of other properties of coals including coking and matting characteristics.

In attempting to gasify powdered coal by blowing it, along with steam and air or oxygen, into a stationary fuel bed, a mass of ash rapidly forms over the fuel of the bed and eventually plugs it; channeling also occurs in the bed and the temperature is not uniform throughout the gas-making zone in the bed. Under these conditions the conversion efficiency is low, the $CO_2$ content of the make gas is high, clinkers form in various zones of the bed and the gas-making-capacity of the generator is low. When the coal, steam and another oxidant such as oxygen are blown into an empty, insulated tube which tube functions as a generator, the exothermic reactions occur entirely in the first 6 to 8 feet of the tube when gas-making velocities are employed, and the endothermic reactions occurring in the zone more distant from the inlet cool the fluid stream to the point where reaction is slow; the resulting gas has a $CO_2$ content which is high, above 10 per cent, and it contains considerable unreacted combustible solids. I find that this difficulty can be corrected when a mass of solids which are denser and/or much larger than the powdered fuel are suspended in the generator in the path of the stream of gas-making fluids as a bed so that the rate of travel of the powdered coal through the bed is so much more retarded or inhibited than that of the gaseous components of said stream that the powdered fuel is substantially completely reacted in the stream within the bed. The temperature may be maintained quite uniform throughout the major portion of the bed by maintaining and controlling the velocity of the stream initially comprising say steam, oxygen and powdered solid fuel, such that the said larger-size solids of which the bed is comprised are fludized; the latter velocity being such that the amount of entrainment of the bed solids in the outgoing gasiform stream is very small. The ash which is largely in an extremely fine state of division is carried out of the generator entrained in the gas stream. Externally applied heat is not required in the practice of this invention.

One of the major objects of this invention is to employ fine size or powdered solid fuel, such as coal, char, lignite, brown coal, coke semi-coke and other solid fuels, which fuels may first be treated for reduction of ash content, as generator fuel, namely as gas making material. Another object is to make gas either continuously or in cycles discontinuously from a substantially powdered solid fuel under such conditions that it is substantially free from unsaturated, gum-forming hydrocarbons as it is discharged from the generator. A further object is to gasify powdered fuel without clinker difficulties, that is, without appreciable accumulation or bothersome deposition of slagged ash in the generator and offtake conduits.

It is also an object of this invention to make a combustible gas, using powdered fuel, the composition of which gas may be altered readily from that of producer gas to that of water gas or city gas. Other objects will become evident from the disclosures hereinafter made.

In its broadest aspect this invention comprises passing a stream of gas-making fluids including powdered fuel and an oxidant upwardly through a deep bed of small size, but not powdered solids, which solids are preferably incombustible solids at a particular velocity while said solids are at a gas-making temperature of the order of 1600° to 2000° F.; the particular stream velocity is variable, controllable and in general somewhat greater than the minimum lifting velocity with respect to the solids of said bed. The latter solids may be inert, catalytic or both and under particular conditions they may comprise combustible matter.

This invention can be understood most readily when the behavior of variously sized solids in a gasiform fluid stream is clearly understood. Particles sized say 40 to 80 microns can be so fluidized when a gasiform fluid is passed upwardly through a mass of them confined in a chamber, that the whole mass resembles a boiling liquid. The superficial velocity in this example using air as the fluidizing medium and silica as the solids is at least about 0.17 foot per second although velocities of 1.0 foot per second or higher can be employed. In the thus fluidized bed appreciable expansion of the bed takes place above the volume of the settled bed. Now, with very fine size particles say 20 microns and smaller, the bed swells in volume very appreciably, sometimes to twice the settled volume. However, these solids do not readily fluidize, they appear to exhibit alternate agglomeration (floculation) and repulsion properties; uniform contact of the gasiform fluid with these solid particles is not good and an appreciable amount of fines are entrained in the exit gases. Upon using larger sizes, approximating say 500 microns in diameter (35 mesh) the viscosity of the bed, which increases with increments in particle size, is greater and a higher minimum velocity of the fluidizing gas stream is required about 0.4 foot in this case. Furthermore, it is increasingly difficult to initiate fluidization in a bed of solids initially at rest, as the particle size increases and likewise the time required to promote fluidization increases. The fluidizing time will vary from 5 seconds for 60 to 80 micron particles of low specific gravity (approximating 1.2) in a shallow bed and 10 minutes to an hour with deeper beds, larger size particles, denser particles or with combinations of these variables. When fluidizing refractory solids such as are, or may be, used in the practice of this invention, namely, particles having a diameter of the order of say $\frac{1}{16}$ inch to about $\frac{1}{2}$ inch diameter, a still different set of conditions obtains; if they have a specific gravity greater than 2.0 to 2.5 they are extremely difficult to fluidize in very deep beds and the time required to completely fluidize a deep mass of the solids is great. But of still greater importance is the fact that one can not truly fluidize large and dense solids in a deep bed unless the diameter is also great. In other words there is a definite ratio of depth to diameter, commonly called the $L/D$ ratio, which can not be exceeded without slug formation in the bed. This $L/D$ ratio below which slugging does not occur is approximately 8 for solids 120 microns' diameter having a specific gravity 1.17; it is about 5 for solids of the same gravity but 200 microns' diameter and 3 for solids of the same material having a diameter of 500 microns.

In gasifying coal as a powder or in small size particles up to about $\frac{1}{8}$ inch, it is most desirable that a mass of large-size solids, $\frac{1}{8}$ to about $\frac{1}{2}$ inch diameter, be heated and fluidized as a bed in a generator before the coal and an oxidizing agent are introduced into said generator and into said mass. For efficient gasification the mass should be deep, 25 to 40 feet. The functions of these large-size solids include:

(a) Equalize temperature in an appreciably deep zone of said bed.
(b) Break up coke particles about as fast as they might form.
(c) Store heat for use in promoting endothermic gas reactions.
(d) Promote attrition of large size particles of the solid fuel during its gasification.
(e) Prevent accumulations of sintered ash in the bed.
(f) Retard the rate of upward travel of the powdered fuel in said bed so that it can be completely gasified in said bed, and
(g) Permit the use of sufficiently high stream velocity in the generator so that powdered ash is carried out entrained in the make gas.

In my experiments I find that a finely powdered substance can be blown or carried right through the bed of fluidized solids if the latter solids are appreciably larger than the particles of the powder, and the velocity of the fluidizing medium is appreciably greater than the minimum lifting velocity for said solids. The higher the linear stream velocity the more rapidly the powder is carried through the bed, other factors remaining the same. In making gas from powdered fuel it is desirable to have maximum time of contact and intimacy of contact of the fuel with the other gas making substances in the fluid stream and this is accomplished by employing a sufficiently low fluidizing velocity which retards the rate of travel of the powder up through the bed so that the combustible portion thereof is substantially all consumed by gas-making reactions. Expressed differently, the greater the velocity of the stream of gas-making materials up through a bed of fluidized solids the less dense is the bed and the shorter the contact time of the stream with said solids, the depth of bed being constant. At too high a velocity, an appreciable amount of the combustible solids may pass out of the bed in the gasiform stream. Accordingly, for high rates of gas making a deeper bed of solids is employed than when lower rates are desired. However, it is noted that when bed solids of increased specific gravity are used, an increase in stream velocity may be employed without changing the nature of the tortuous course of said stream in the bed, and without changing the bed porosity or intimacy of contact of the gaseous components of the stream with the solids, but the duration of their time of contact is reduced. Thus, control may be maintained over the time and intimacy of contact of the stream with the solids, one independently of the other. The gaseous fluids passing up through the bed of solids travel at a higher linear velocity than the fuel particles initially suspended in the gas stream.

This general process of making gas is believed to be unique in that there are a number of specific conditions that must prevail for its successful operation and that clinker difficulties are absent. The temperature of the solids must not be higher than about 2000° F. and with many refractory solids not above 1850 to 1950° F. because of the tendency of small solids to stick together, agglomerate at elevated temperatures which are appreciably below their true melting points. A minimum temperature also prevails for particular reactions, which will be discussed more fully in relation to particular examples; making water gas from powdered solid fuel, steam and oxygen, the minimum temperature is approximately 1600° F. A further specific condition relates to the size of the solids of which the bed is comprised. They should be, at least initially, substantially uniformly sized, for example $\frac{1}{8}$ inch to $\frac{3}{16}$ or $\frac{1}{8}$ to $\frac{1}{4}$ inch or about $\frac{1}{16}$ to $\frac{7}{16}$ inch. Normally smaller sizes than $\frac{1}{8}$ inch should not be used because of the tendency of most small-size particles to mat and stick together at temperatures above about 1600° F. Silicious particles having much higher melting points will stick together to such an extent that fluidization is not satisfactory when they are used as the bed solids in sizes of say 40 to 100 mesh at a temperature of 1850° F. When the solids comprise the same silicious substances as the foregoing but are sized above about ⅛ inch mean diameter they perform satisfactorily at 1750° to 1900° F. according to their particular chemical nature. In other words, as the size of the solids increases from that of a fine powder to ⅛ inch, the matting temperature may increase over a range of 600° to 800° F. or more, varying with different solids.

Still another particular condition relating to the proper functioning of this invention in gasifying solid powdered fuel, is the relation of the softening temperature of the fuel ash and the mean gas-making temperature, namely the temperature of the refractory solids in said bed; the temperature of these solids should not be appreciably higher than the softening temperature of the ash and preferably it should be somewhat lower than the said softening temperature. When the latter condition prevails, it is possible to blow the ash out of the generator in the gas stream substantially as fast as it is formed, thereby permitting a uniform and high concentration of carbonaceous solid fuel in the void space in the bed of solids. Ash does not stick to the wall of the generator-gas-offtake under these conditions.

All solids are not equally suited for use in the bed. Silica, alumina (fused), aluminum silicate, chrysoberyl fused calcium, fused magnesium oxide and other difficultly fusible solids which have a high softening point may be used. However, because of the effect on the generator lining it is highly desirable to use as solids materials which are not too high in the scale of hardness. Likewise, because of the very high stream velocities required to maintain solids as large as ⅛ to ¼ inch in a substantially fluidized state, it is desirable to use as bed solids materials that will not readily become sticky when heated and those with a specific gravity that is not excessive. The fused oxides of calcium and/or magnesium are satisfactory; they melt at 2570° and 2800° C. respectively, have densities of 3.5 and 3.8 and hardness about 5.0. Silicon carbide and corundum, on the other hand, are high in the scale of hardness being about 9.0. The fused oxides of calcium and/or magnesium do not react with water at elevated temperatures, in fact they do not readily react with water at ordinary temperatures, differing in this respect from the ordinary calcined product made from the carbonate; they are particularly good contact materials and seem to have catalytic effect in the gasification of coal yielding a water gas having a lower $CO_2$ content than anticipated. In general, the solids employed should have a high softening temperature, be resistant to disintegration upon being heated to 1900° to 2000° F. and should not be too abrasive; they should be harder or less friable than the fuel particles so that the latter are continuously subjected to attrition and disintegrating action through contacts with the said solids during gasification. The use of rather large size solids approximating ¼ to ½ inch diameter is advantageous in operating at the high temperature above 1900° F. and in promoting attrition of any large particles of ash or shale which may be present in the fuel fed to the generator.

Because very deep beds of solids of large size approaching ½ inch diameter can not be fluidized with complete control without slugging and with satisfaction in generators of moderate diameter by blasting with a gasiform fluidizing fluid beneath the supporting grid, it is most effective and beneficial to supply supplementary means for maintaining the solids in different zones of the bed in a desired state of fluidization or bed-density which state may be different in the different zones. This feature is an important part of this invention and comprises introducing high velocity jets of the fluidizing medium into the mass of solids in the generator at points spaced around the generator, at a plurality of levels above the grid or grate. The flow of gasiform fluid through the jet nozzles at one level is preferably controlled separately from the flow through the jets at a different level so that a different effect may be produced in the fluidized solids in the different zones of the bed. Now, increasing the superficial gas velocity in a bed of fluidized solids sized in the range ⅛ to ⅜ inch diameter does not in itself facilitate the minimization of channeling or slugging in a deep bed; however, when extra fluidizing gasiform fluid is introduced at high velocity into the bed at an angle from vertical particularly when the bed diameter increases upwardly, a decidedly beneficial effect results. This is believed to be new in the art.

The invention is best described by reference to the drawings and the citation of particular examples of operation.

Figure 3:
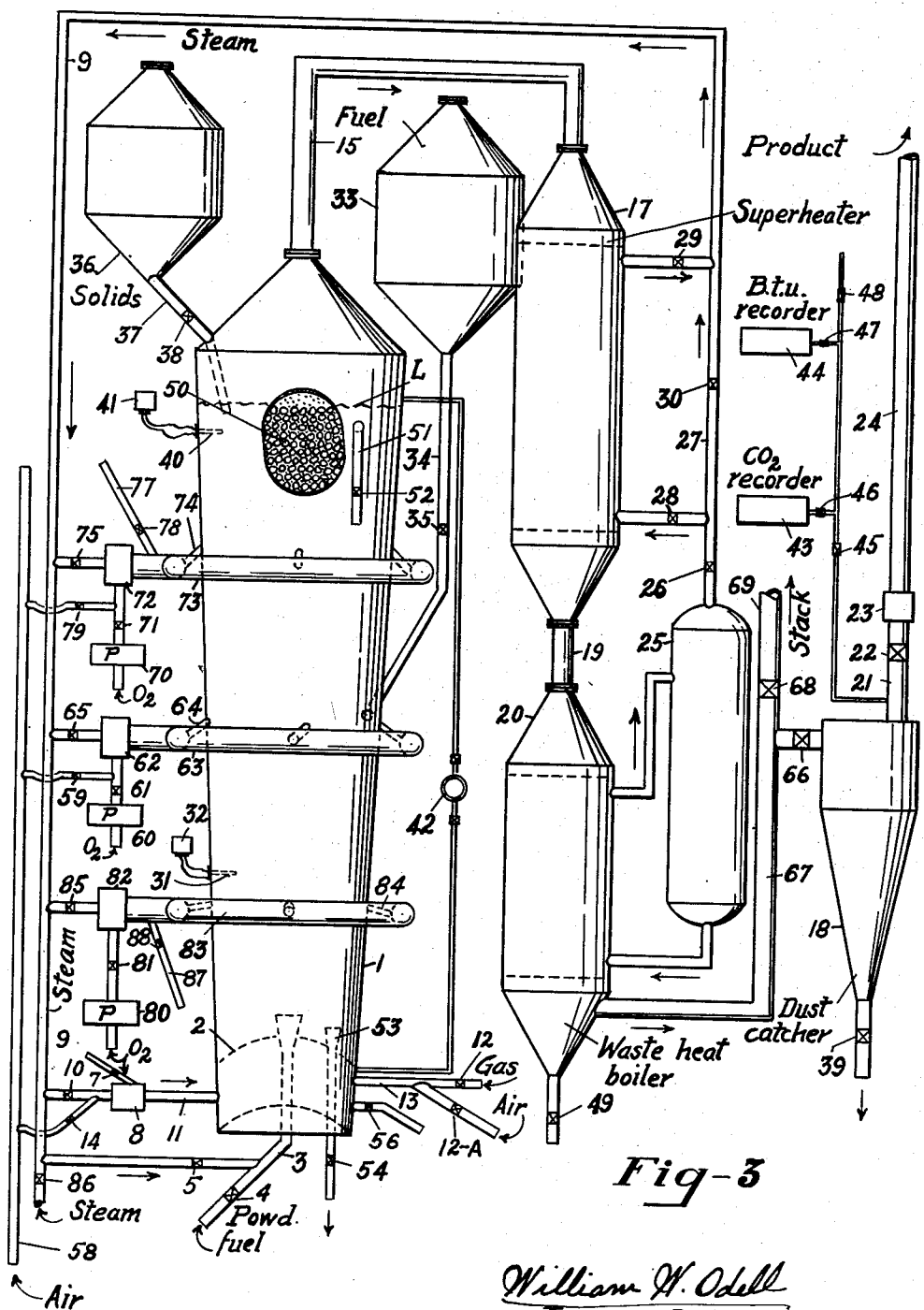

Figure 3 is a diagrammatic view in elevation of a generator in which the invention may be practiced most advantageously when using the larger sizes of solids, approximating say ¼ to ⅜ inch diameter and deep beds. Because of the difficulties in fluidizing a deep bed of such solids by supplying the fluidizing gasiform medium beneath the bed, means are shown in this figure whereby channeling can be kept to a minimum, the bed densities in different zones of the bed at different levels can be regulated other than by the velocity of the fluid supplied beneath the grate or grid 2, and the starting time from a settled bed minimized.

Figure 1:
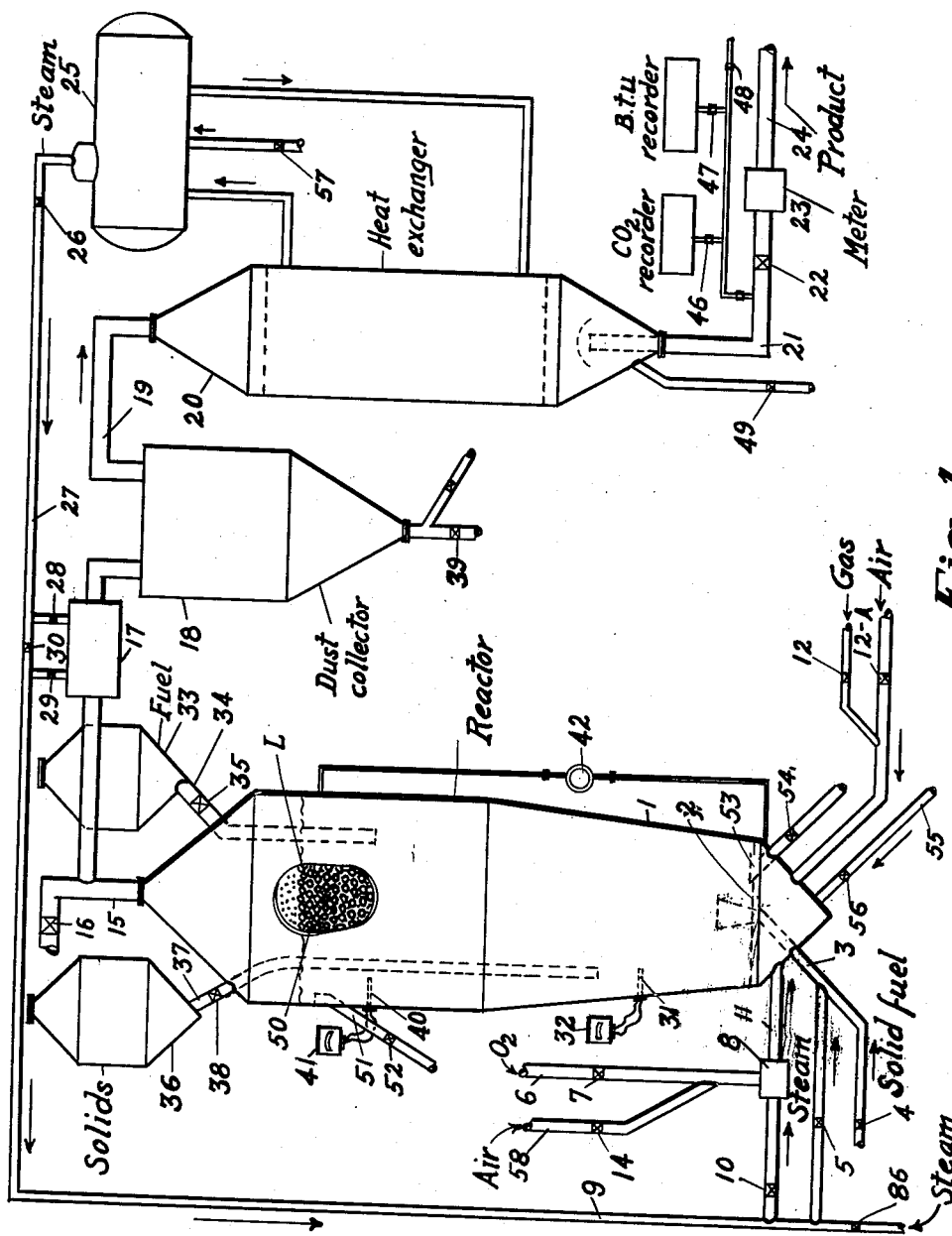
Figure 1 shows diagrammatically in elevation one form of apparatus in which the invention may be practiced; it includes a suitably connected reactor or gas generator, dust collector and waste-heat boiler which are adapted for use in making water gas substantially continuously. A portion of the generator wall is cut away to show the interior in section.

Referring to Figure 1, the refractory lined generator 1, is supplied with steam and powdered or fine-size solid fuel through valves 5 and 4 respectively, and with the mixture through intake conduit 3; oxygen is supplied below the grate or grid 2 through conduit 6 and valve 7, mixing chamber 8 and conduit 11; air is supplied through conduit 58 and valve 14, chamber 8 and conduit 11 whereas steam supplied beneath the grid passes from conduit 9 through valve 10 to the mixing chamber 8 and then through conduit 11. Fuel gas is supplied for heating the solids initially through valve 12, air for its combustion passes through valve 12A and the mixture enters the generator through conduit 13. Stack gases pass out through offtake 15 and valve 16, whereas the major gaseous products of reaction pass from the generator serially through offtake 15, heat exchanger (steam superheater) 17, dust catcher 18, conduit 19, waste heat boiler 20, conduit 21, valve 22, meter 23 and conduit 24 to suitable equipment of known design for treating, cooling and scrubbing, and for pumping the fraction desired for recirculation back to the generator. From boiler drum 25 steam passes through valve 26, conduit 27, valve 28, superheater 17, valve 29, conduit 9 and on to the generator as described, valve 30 being used to control the amount of steam supplied which by-passes the superheater. Solid fuel in prepared size, which size is preferably smaller than the refractory solids, is supplied from reservoir 33 through conduit 34 and valve 35, either as the total supply or only as an auxiliary supply supplementing that introduced through valve 4. The refractory solids are fed to the generator as required from reservoir 36 through conduit 37 and valve 38. Solid particles caught in dust catcher 18 may be discharged through valve 39. Thermocouple 31 is suitably connected with pyrometer 32 for indicating temperature in the bed of solids and likewise thermocouple 40 is similarly connected with pyrometer 41. The differential pressure across (through) the bed of solids is indicated by the differential gage 42 which is suitably connected with the generator above and below the bed of solids for indicating difference in pressure. The $CO_2$ recorder 43 and B. t. u. recorder 44 are supplied with gas through valve 45 and separate control valves 46 and 47 respectively, excess gas passing through purge valve 48. Accumulations in the bottom of the waste heat boiler 20 are discharged through valve 49. The solids shown at 50 in the generator have a level L when fluidized; they may be withdrawn as and when desired through offtake 51 and valve 52 or through receiving cup 53 and valve 54. Other reactant matter or recirculated combustible matter recoverd from product gases passing out through offtake 24 may be introduced through conduit 55 and valve 56. Water to the boiler system is supplied through valve 57. Additional superheated high pressure steam is supplied as required through valve 86.

Figure 2:
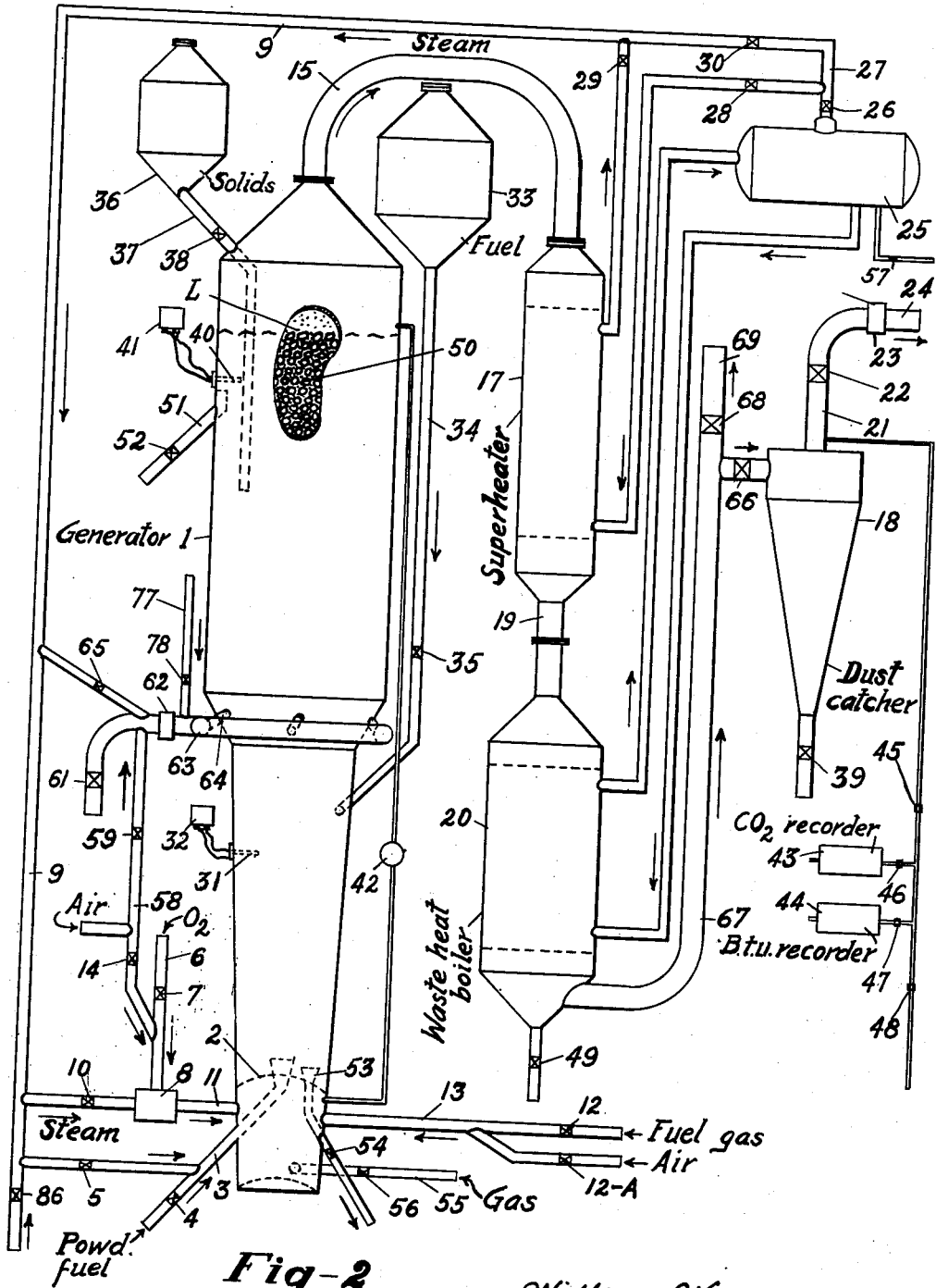
Figure 2 is also diagrammatic and shows in elevation another embodiment of the invention, comprising a gas generator suitably connected with a waste heat boiler, steam superheater, dust catcher and feed reservoirs for supplying solid fuel and refractory solids; it is adapted for making gas continuously or intermittently.

Referring to Figure 2, substantially the same general system of numbering is employed, but because of the different arrangement, 19 in this figure is the connecting conduit between the steam superheater and waste heat boiler, and the offtake from the dust catcher is numbered 21 with control valve 22. The valve 61 controls the supply of combustion supporting fluid to bustle pipe 63 and valve 65 controls the supply of steam thereto, the mixture passing through high velocity jet nozzles 64 which are spaced around the generator, each of which are preferably equipped with an orifice of predetermined size. Valve 66 at inlet to dust catcher 18 is used in conjunction with valve 68 to control and direct the flow of gas from conduit 67 through 18 or through stack 69; the steam-air mixing box 62 causes mixing to occur before the fluids pass into bustle pipe 63. Air is supplied to the generator also from conduit 58 through control valve 59.

Referring to Figure 3, the numbering system is the same as in Figure 2, except additional numbers are employed above 66 to designate parts not shown in the latter figure. In particular, this figure depicts means for introducing a gasiform fluid at high velocity into the bed of solids at a plurality of levels above the grate in a still larger plurality of jets through nozzles spaced around the circumference of the generator for purposes that will be described. In this figure, combustion supporting fluid is supplied to the middle bustle pipe 63 through pump 60, valve 61 and mixer 62; it passes into the generator through nozzles 64 which are preferably angularly disposed upwardly and also angularly disposed horizontally to provide upwardly sloping somewhat tangential inlets. The steam under high pressure and superheated passes from valve 65 to the mixer 62 where it mixes with fluid from 61 before passing on to the nozzles. Similarly, the combustion supporting fluid is supplied to the top zone of generator 1 through pump 70, valve 71, mixer 72, bustle pipe 73 and nozzles 74, whereas the steam is supplied through control valve 75; the jet nozzles in this zone may be radial or slope upwardly inwardly as shown. In the bottom zone above the grid 2, combustion supporting fluid passes from pump 80 through valve 81, mixer 82, bustle pipe 83 and nozzles 84 into the generator, the steam under high pressure passes through valve 85 to mixer 82 from which it passes on mixed with combustion supporting fluid through the bustle pipe 83. Vapor phase hydrocarbon materials may be supplied through conduit 77 and valve 78 and/or through conduit 87 and valve 88.

*Example I.—Water gas generation at 150 pounds gage pressure*

Referring to Figure 1, the refractory lined generator 1, having grid 2 is filled with the small-size solids, which in this example are fused or sintered calcium oxide sized ⅛ to ¼ inch, almost ⅔ full; the depth of the bed of these solids should be about 30 feet. These solids shown at 50 are supplied through valve 38 and feed line 37 from reservoir 36. Fuel gas and air are now introduced beneath the grid, through valves 12 and 12A and conduit 13, and combustion of this gas is promoted in the bed to initially heat the solids; the products of combustion are discharged from above the bed through offtake 15 and stack valve 16. This heating operation is continued until the solids are heated to a temperature of about 1450° to 1650° F. During the forepart of the heating period the velocity of the stream of gas and air up through the bed need not be sufficient to completely fluidize the solids thereof but in the final stages it is essential that they be fluidized to avoid overheating and agglomeration of the solids. After a temperature of about 1650° F. is reached powdered or small-size coal, steam and oxygen are introduced by slowly opening valves 4, 5, 7 and 10 and closing valves 12 and 12A, meanwhile maintaining the bed in a fluidized state. Stack valve 16 is now closed as valve 22 is opened, the pressure in generator 1 is built up to 150 pounds' gage and the gaseous products from the generator pass serially through steam superheater 17, cyclone separator 18, offtake 19, waste heat boiler 20, offtake 21, valve 22, meter 23 and conduit 24 and thence to a system of known design for cooling and handling gaseous reaction products. It is now necessary to carefully adjust the proportions of steam, oxygen and coal supplied to the generator. This is done by the combined use of thermocouple 40 with temperature indicator 41, $CO_2$ recorder 43, differential pressure gauge 42 and B. t. u. recorder 44;

valves 45, 46 and 47 are opened and bleeder valve 48 is also opened. The calorific value of the gas as recorded by the calorimeter 44 for saturated gas should indicate a heating valve of about 300 to 315 B. t. u. per cubic foot of gas; the $CO_2$ recorder 43 should indicate about 6 to 10 per cent $CO_2$; the temperature indicator 41 should indicate a temperature of about 1750° to 1850° F. when the operating variable are finally adjusted, and the differential pressure gauge 42 should indicate that the solids are in a fluidized state. Should the temperature rise above the chosen 1850° F. in the bed of solids 50 the relative amount of steam supplied is low or the oxygen supply is to high or both; if the $CO_2$ content of the gas increases and the temperature decreases the amount of steam is proportionally excessive. The amounts of coal, oxygen and steam supplied to the generator are metered by recording meters and the amounts of each are adjusted from time to time to care for variations in the quality or temperature of the materials fed to the generator. This operation is continuous, but it may be desirable at times to withdrawn solids from the bed and this way be accomplished by the use of valve 54 or valve 52. Fresh solids may be added as desired by opening valve 38. Coal or other small size solid fuel may be introduced into I from the overhead reservoir 33 by opening valve 35. It is desirable that the bed be kept at a constant level substantially as shown at L.

For the purpose of clearness and to aid in the exemplary description of this invention, some of the reactions which may advantageously be conducted within its scope, generating water gas, are presented as follows:

(1) $2C+O_2=2CO$     +104,600 B. t. u.
(2) $C+O_2=CO_2$     +174,000 B. t. u.
(3) $C+H_2O=CO+H_2$     −70,400 B. t. u.
(4) $C+2H_2O=CO_2+2H_2$     −71,700 B. t. u.
(5) $C+CO_2=2CO$     −69,400 B. t. u.

These reactions occur in varying relative amounts when carbon is gasified in an atmosphere of steam and oxygen. When the amounts of the latter reactants are proportioned so that a mean temperature of approximately 1830° F. is maintained in the mass of solids in the generator and the outlet gas is about 1700° F. employing steam at about 800° F. and 95 per cent oxygen at 800° F. the attainable results, gasifying fuel which is substantially carbon, but containing a small per cent of hydrogen, are substantially as follows:

| | Per M cu. ft. of gas made |
|---|---|
| Combustibles reacting | lbs 21 to 22 |
| Oxygen reacting | cu. ft. 185 to 210 |
| Oxygen; 95% | cu. ft. 195 to 220 |
| Steam reacting | lbs 14.5 to 16.5 |
| Steam supplied | lbs 18.5 to 21.0 |

Representative composition of the gas is substantially within the range as follows:

Composition of product gas, per cent by volume:

| | | | |
|---|---|---|---|
| $CO_2$ | 6.0 | to | 10.0 |
| CO | 57.2 | to | 52.3 |
| $H_2$ | 34.5 | to | 35.0 |
| $CH_4$ | 1.2 | to | 1.5 |
| $N_2$ | 1.1 | to | 1.2 |
| | 100.0 | | 100.0 |

Water gas containing 10 per cent of $CO_2$ is not in equilibrium with carbon at 1800° F.; an appreciably lower $CO_2$ content may be obtained at 1750 to 1850° F. in the practice of this invention when the bed of fluidized solids is deep, say 30 feet, when the rate of feed of the solid fuel to the generator is great enough to maintain a considerable concentration of said fuel in the fluidized bed, namely more than about 15 per cent in the lower zones, and when the velocity of the fluidizing stream initially comprising steam and oxygen is so coordinated or synchronized with the rate of feed of fuel and the size of the fuel fed to the generator that the rate of segregation of the fuel particles and their upward migration in the bed of fluidized solids is substantially equal to but preferably not greater than the rate of feed of fuel to the generator. The rate of feeding the fuel for efficient operation should not be less than the gasification rate. Employing solids sized as given above, the velocity of the stream initially containing the gas making fluids in the generator may advantageously be about 4 feet per second at 1800° F. when the fluidized refractory solids have a specific gravity of 2.4, based on the empty generator. Optimum results are obtainable by employing such a velocity that the refractory solids are just fluidized, namely the optimum stream velocity is slightly greater than the minimum fluidizing velocity. Under the latter conditions, the fuel particles may be of finer size than when high velocities of fluid flow are employed; the fuel may be about 20 to 80 mesh along with the extra fine sizes that accompany grinding. Very fine sizes may be employed with a deep bed of refractory solids or when employing temperatures of 1800° to 2000° F. in the mass of fluidized solids. Coarser size fuel may be used but it is most advantageously employed for the purpose of increasing the concentration of fuel in the mass of fluidized solids and decreasing the rate of segregation or upward travel of the fuel particles in the bed. The rate of segregation of the fuel is lower when large sizes are used. Thus, for a given velocity of fluid flow in the generator, the size of the fuel fed thereto should be such that an apprecible amount of unburned fuel does not pass out of the generator entrained in the gas.

When a fuel such as bituminous coal, containing considerable volatile matter, is used as generator fuel, the volatile matter and hydrogen released or produced at the gas-making temperature of about 1830° F. so increases the volume of the gas made that the quantities of steam and oxygen required per 1000 cu. ft. of gas made are somewhat lower than when using a low-volatile fuel. A high-volatile-A bituminous coal can be gasified in a deep bed of solids to yield a gas of low $CO_2$ content and a much higher $H_2$ to CO ratio than with coke fuel.

For final adjustments of these quantities of materials, the various indicators and recorders shown in Figure 1 are employed; when the temperature indicators 32 and 41 show that the temperature in the fluidized bed is dropping and the $CO_2$ recorder 43 shows an increase in $CO_2$ content of the gas, the oxygen supply is increased or the steam supply decreased, or both changes are made. If the rate of make of gas is too high according to meter 23, the supplies of coal, steam and oxygen are reduced. When the temperature in the generator rises and the $CO_2$ content of the gas made increases the supply of coal is insufficient for the amounts of oxygen and steam supplied, and more coal must be supplied.

Again, still referring to Figure 1, the steam supplied through valve 10 is thoroughly mixed with the oxygen supplied through valve 7 in mixing box 8 before passing into the generator. Only sufficient steam is passed through valve 5 to carry the coal supply and this can be eliminated when the coal is supplied from reservoir 33 or fed mechanically as with a worm feeding device of known construction, then all of the steam is introduced through 10, 8 and 11.

Pressures appreciably above or slightly above atmospheric may be used as desired. Also, air may be substituted for some or all of the oxygen when a lower B. t. u. gas is desired which contains nitrogen.

Although various modifications of operations may be employed to suit any particular purpose or any particular fuel, one procedure not evident from the foregoing is the following: It is known that increasing the pressure in the system does not materially influence water gas equilibria, its chief effect usually is on capacity. However, when employing a low fluidizing velocity of the fluids in the lower portion of the bed by controlling the supply of steam admitted through valve 10 and the supply of oxygen through valve 7, the ebullient motion of the refractory solids is limited; under these conditions, particularly when the steam-oxygen ratio is increased somewhat above that given in the foregoing example, the upper portion of the bed, namely the upper ⅓ to ¼ of the bed is cooler by 100° to 300° F. than the lower portion thereof and the $H_2$ to $CO$ ratio in the water gas made is somewhat higher. Thus, it is possible to promote substantially all of the exothermic reactions in substantially the bottom half of the bed when a mass of hot refractory solids are fluidized as a deep bed in a generator while a stream initially comprising steam, oxygen and powdered fuel is passed upwardly through said bed at such a velocity that the mixing of the refractory solids is so limited that endothermic reactions predominate in the top zone of said bed. These conditions are favored by making the lower portion of the generator of smaller diameter than the upper portion. Although it is not necessary to use other than a cylindrical generator for the general practice of this invention, it is preferable that the upper portion of the bed of solids be of greater diameter than the bottom portion thereof.

Before citing other examples for the application of this invention, attention is called to some of the major differences in the practice of the invention compared to known processes in common use. When powdered fuel is treated to the action of oxygen and steam in a stationary bed, the depth of the hot zone is limited to a few inches located in the zone where the oxygen is admitted, all of the exothermic reactions occurring in this limited zone; the velocity of the stream of gas and reactants through the bed must be very low and even then channeling occurs in the bed. When the powdered fuel is fluidized somewhat higher velocities of the fluids through the bed may be employed, but still low, ash accumulates in the bed to a very appreciable extent, and considerable fuel and ash are carried out of the bed entrained in the gas stream. In the practice of fluidized-solids technique, it is known that coarse particles of a given solid substance require, for fluidization as a dense bed, a higher velocity of the fluidizing medium than fine-size powders, other factors remaining the same. Furthermore, the maximum velocity of the latter medium that can be employed without blowing large quantities of the fluidized solids out of the generator is much higher for coarse sizes than for fine powders. It is not economical to gasify powdered fuel in a deep bed by itself, even though fluidized, because of the limiting velocity of the gas-making fluids. When coarse particles are employed, and at higher velocities, it develops that the fine-size fuel particles resulting from partial gasification are blown out of the bed substantially as fast entrained in the gas stream substantially as fast as they are formed. Fine particles resulting from attrition are also blown out of the bed. Now, this high velocity yields a bed of relatively low density, whereas in the present invention employing larger size refractory solids, above about ⅛ inch mean diameter, having a much higher specific gravity than the solid fuel, a denser bed is maintained even when still higher stream velocities are employed. The denser bed retards the rate of travel of the powdered fuel through the bed of solids, but the stream velocity is so great that the particles of the solid powdered fuel travel upwardly, as they are consumed, and the ash passes out entrained in the gas stream. So far as I am aware, there is no other process continuous wherein heat is continuously supplied to a fluid stream of reactants comprising oxygen, steam and powdered fuel, by contacting it with fluidized relatively large size hot solids which solids are continuously being heated while confined in a generator. This is believed to be distinctly new in the art. The stream velocity through the bed of solids is so synchronized with the rate of supply and size of the powdered fuel that very little, if any, fuel is entrained in the generator offtake gas.

When strongly coking coal is used as the powdered fuel, it is necessary that it pass rapidly through the feed line 3 to the generator in order to prevent its matting and plugging the line. Accordingly, this conduit 3 should be of sufficiently small diameter so that the required amount of powdered fuel passes through it at a rapid rate. Should any of the freshly supplied coal particles adhere to the larger solids in the generator, by virtue of the property of coking coals to pass through a plastic state when heated, they will burn off by the action of the steam and oxygen. Herein, this process differs further from gasification of finely divided coal as a mass in a fluidized coal bed, in which latter instance lumps of coke form and sink out of the fluidized state and cause trouble. The ebullient motion of the refractory solids in the bed causes attrition of coke particles that may form.

Brown coal and lignite behave in a different manner than coking coals; they usually contain, as mined, 60 and 40 percent respectively of moisture. It is not necessary to dry these fuels in order to gasify them. It is desirable that they will readily flow through a conduit and this they will do when the moisture contents are respectively less than about 40 and 30 percent. The moisture in these fuels supplies much of the generator steam required and thereby makes more steam available for other uses. However, additional oxygen must be supplied to the generator in such cases, in order to supply the heat necessary to evaporate the water in the fuel and raise its temperature to reaction temperature. These fuels, brown coal, lignite and sub-bituminous coal are more reactive at elevated temperatures than ordinary coke and they can be successfully gasified at temperatures lower than 1850° F.

*Example II*

Referring to Figure 2 and making producer gas using air and steam as the gas making fluids and continuously blasting the bed of refractory solids with a mixture of these fluids and supplying fine size anthracite coal as fuel. Conditions for operation and results attainable are typified as follows:

| | |
|---|---|
| Refractory solids, silica, specific gravity | 2.4. |
| Refractory solids, particle diameter, inches | 0.25. |
| Coal, calorific value, B. t. u. per lb | 12,800. |
| Coal, size of particles | 40 to 100 mesh. |
| Coal introduced per minute, per sq. ft. of generator area just above the grid, lbs | 1.85. |
| Total air to generator per sq. ft. sectional area measured just above grid 2, corrected to 60° F. and atmospheric pressure, cubic feet per minute | 100. |
| Actual temperature of air, °F | 1000. |
| Total steam, supplied at 800° F., pounds per minute per square foot area above grid | 0.7. |
| Initial pressure of steam and air at base of generator, pounds gage | 25 to 35. |
| Approximate composition of producer gas, per cent by volume: | |
| $CO_2$ | 5.5 |
| CO | 25.5 |
| $H_2$ | 12.8 |
| $CH_4$ | 0.5 |
| $N_2$ | 55.7 |
| | 100.0 |
| B. t. u. per cubic foot | 129. |

In conducting this operation, the coal can be introduced into generator 1 from reservoir 33 through valve 35, and this should be done continuously. Of course, it can be supplied through valve 4, or both valves 4 and 35. The producer gas is discharged through offtake 15 and passes serially through 17, 19, 20, conduit 67, valve 68 and stack 69 until the composition is satisfactory, that is, at the start of operations, then valve 68 is closed and valve 66 is opened and the gas is conducted out through dust collector 18, offtake 21, valve 22, meter 23 and offtake 24 to a recovery system. The initial heating of the solids in the generator is conducted as described in Example I, by burning gas supplied through valve 12 and conduit 13. The air used during the gas making period is supplied under control through valves 14 and 59, the steam enters through valves 10 and 65, the mixture passing through conduit 11 and bustle pipe 63 respectively, to the generator; some steam also enters through valve 5.

After the operation is well under way, it is necessary to finally adjust the quantities of air, steam and coal supplied; they vary according to variations in the moisture content, ash content, and calorific value of the coal, according to the amount of coal blown over if any, and according to other variables including generator size and radiation losses. In making final adjustments the composition of the gas and temperature in the mass or fluidized bed in the generator are major guides. When the steam is in great excess, the temperature indicated by pyrometer 32 will fall below 1750° F., the $CO_2$ content of the gas will rise to 9 to 11 percent or more and the nitrogen content also will be higher. If too little steam is used, the generator bed temperature increases appreciably above 1750° F. as indicated by pyrometer 32 and the hydrogen content of the gas decreases. The air and steam supplies are adjusted to maintain a temperature in the lower ⅓ to ½ of the bed at approximately 1750° to 1850° F.; the temperature may be somewhat higher when conditions warrant.

When making producer gas in the described manner, it will be found difficult to fluidize the refractory solids of the stated size if the bed is very deep and the generator is not likewise of very appreciable diameter. The greater the depth of bed, the larger the size of the refractory solids, and the denser the solid particles, the greater the diameter must be to obtain fluidization without channeling. It is much preferred to operate without channeling and it is usually not desirable to provide the required L/D ratio (ratio of bed depth to bed diameter). Very satisfactory results may be obtained under the latter conditions by introducing additional steam and combustion supporting fluid at a zone of the bed between the top and bottom thereof, preferably into an expanded bed, namely a bed of greater diameter. This is accomplished, still referring to Figure 2, by admitting the secondary steam through valve 65, and the secondary air as described through valve 59, mixing them in 62 and conducting the mixture through bustle pipe 63 and inlet nozzles 64. The velocity of the mixture through the latter nozzles should be high. Preferably, the bed should have an expanded diameter at about the zone where the secondary air and steam are introduced because of the extra volume of fluid added and because the density of the gas made is greater than that of the steam-air mixture supplied beneath the grid 2. Thus, as the fluid stream passes up through the generator, the volume increases by chemical reaction as well as by decrease in pressure and the density of the stream increases so that the sectional area of the bed should preferably be increased in the zone above that in which secondary fluid is added. The volume of fluid supplied through nozzles 64 should be less than that supplied at the base of the generator unless the expansion of the upper zone of the bed is such that the extra supply of fluid is necessary to maintain suitable fluidization of the refractory solids in the top zone of the bed. The latter zone should be sufficiently well fluidized so that the ash is substantially completely carried out of the generator entrained in the gas; the bottom zone, lower half of the bed should be so dense that the coal is consumed before it can work its way up through the bed. The densities in the upper and lower halves of the bed are separately controlled by controlling the relative amounts of gas-making fluids supplied to the base and the midway portion of the generator.

When operating conditions are adjusted for the rate of "make" desired, the amount of combustible solids carried over may be adjusted as follows: If an appreciable amount is carried over entrained in the gas, it can be reduced by using larger size coal particles or by decreasing the rate of supply of fluids to the base of the generator and increasing the supply of fluids to the upper zone through nozzles 64. The amount of oxygen and steam supplied through 64 must not be in excess of that required to burn the coal particles in the upper portion of the bed or else the per cent of inerts in the gas will increase rapidly and the calorific value decrease materially. Hence, it will be noted that there is a relationship between the velocity of fluids in the lower zone, size of coal particles, rate of feed of coal and the rate of supply of secondary gas-making fluids to the upper portion of the bed. When the rate of supply of secondary fluid is necessarily high, the coal particles should preferably be so fine that they pass upwardly through the lower zone fast enough to supply material for the steam and oxygen to react with, in the upper zone of the bed. Increasing fluid velocity in the bottom half of the bed also increases the concentration of combustible solids in the upper half of the bed. It is preferable, in order to avoid excessive carry-over of combustible solids, that the coal be supplied entirely in the bottom half of the bed or at the bottom thereof. It is preferable that the refractory solids in the upper zone of the bed, namely the upper ⅓ to ½ of it, be less dense than the lower portion thereof or at least be in a more violent state of motion than those in the lower zone; this appears to be essential in order to rid the bed of ash accumulations. In other words, lower bed density is desired in the top zone than in the bottom zone of the bed. When operating conditions are finally adjusted, it will be found that the total quantities of materials supplied to the generator will be approximately as follows:

Steam per 1000 cu. ft. of gas made, lbs. ____ 7.0
Coal per 1000 cu. ft. of gas made, lbs.
                                           13.0 to 14.0
Air per 1000 cu. ft. of gas made, cu. ft. _____ 710

In ordinary, present commercial practice, it is not desirable to use either superheated steam or preheated air in making producer gas, because the high temperature zone is thin in a stationary bed and clinker troubles are experienced unless a great excess of steam is used. This difficulty is corrected by the use of a bed of fluidized refractory solids as described above.

In making producer gas as outlined above, the amount of total steam used may be divided as follows: 20 to 40 percent may be introduced through valve 65, bustle pipe 63 and nozzles 64, and 80 to 60 percent through the bottom of the bed through the valves 10 and 5. The air may be similarly proportioned, but a somewhat greater amount of air may be introduced through 14 and lesser amount through 59 than the percentage amounts given for steam. When gas of higher calorific value is desired, oxygen may be substituted in part for the air and the amount of steam used adjusted to keep the temperature in the mass of fluidized solids in the desired range.

*Example III*

Generating water gas from powdered fuel by reacting the fuel with steam in contact with heated, refractory, fluidized solids and periodically heating said solids. Referring to Figure 2, the refractory solids are initially heated by burning gas in contact with them, substantially as described in Example I, taking the blast gases off through 15, 17, 19, 20, 67 and 68 and out stack 69. After the solids are heated to about 1950° F., the air and gas valves 12A and 12 respectively, are closed and steam valve 10 is opened so that a steam run can be made. During the heating period, the pressure beneath grid 2 is about 25 to 40 pounds' gage and the rate of supplying the air and fuel gas is such that the refractory solids are fluidized as a dense bed in generator 1, the air being in such excess that the stack gases are substantially free from combustible components; preheated air is preferable to cold air. The bed of refractory solids should be about 30 feet deep and could be deeper. The heat stored in these solids during the heating period is used to supply the heat absorbed by the endothermic water gas reactions. During the run period, the superheated steam is supplied through valve 10 at a rate adapted to keep the refractory solids in a dense state of fluidization. Because of the high temperatures employed, which are desirable for long cycles and for producing a gas of low $CO_2$ content with minimum excess of steam, it is quite desirable that the size of the refractory solids be larger than ⅛ inch; ¼ to ½ inch diameter is preferred. Taking ⅜ inch solids in this example, the air-blasting rate during the heating period is about 260 cu. ft. per minute per square foot of area of a horizontal section of the bed just above the grid 2, based on measurement at 60° F. and at atmosphereic pressure. Coal is fed to the bed at a rate approximating 1.65 pounds per square foot area per minute during the air blasting period. This heating is kept up until the temperature of the solids is about 1950° F. The time required to reach this temperature varies according to the radiation losses, temperature of the air as introduced into the generator and certain other factors including the depth of the bed and heat capacity of the solids. The time will approximate 15.5 minutes for a 30-foot bed. During the steam run, the steam is introduced at a rate of about 7 pounds per mniute, per square foot of generator area just above grid 2. Coal is fed to the generator during this steam run at a rate of about 4.6 pounds per minute per square foot area. The duration of the run is about 7.5 minutes varying according to the degree of superheat of the steam. A complete cycle in this example is about 23 minutes. The make of gas (water gas) per cycle is about 1750 cu. ft. per square foot of sectional area above the grid. This rate of gas production amounts to about 4550 cu. ft. per hour. The gas-making or steam run period can be prolonged by the use of some oxygen with the steam. Furthermore, higher steam flow rates can be used when the size of the coal particles are not too fine, particularly when the refractory solids have a specific gravity greater than 2.4 which latter is the gravity of the silica solids used in this example. After the temperature in the bed of refractory solids as decreased to about 1650° to 1700° F. the steam run is discontinued by closing valves 4, 5 and 10, opening air valve 14, opening stack valve 68 and closing valve 66. During this change from run to heating period, care is taken to maintain the bed of refractory solids in a fluidized state by maintaining the necessary pressure differential through the bed. Now, it will be found that as the shift from run to heating period is made, there is unconsumed coal present in the bed of refractory solids and that this might advantageously be used by air blasting before introducing coal for heating. The latter coal is then introduced by opening valves 4 and 5 or 35, employing excess air for its complete combustion. In order to prevent overheating of the surfaces of the refractory solids, it is preferable that an appreciable portion of the total air used during this heating period be introduced through inlets between the top and bottom of said bed as through 59, 62, 63 and inlet nozzles 64; this not only aids in maintaining desired fluidization of the bed, but also reduces the amount of combustible matter in the stack gases to substantially nil. The carbon of the coal thus may be burned largely to CO in the bottom half of the bed and the CO thus formed is burned to $CO_2$ in the upper half of the bed. The cycles are repeated.

Because of the large drop in pressure through the bed, about 15 pounds per sq. in. in this case, it is more economical to operate, under Example III in a modified manner whereby producer gas is made during the heating period and water gas is made during the steam run period. In this procedure, the concentration of coal in the bed is kept so high throughout the heating period relative to the air supply, that the stack gas is a good grade of producer gas. In this manner the gas-making operation is continuous, but the kind of gas changes in cycles from producer gas to water gas. The coal feed rate can be set and the steam and air valves 10 and 14 and offtake valves 66 and 68 are now the major operating valves, but still introducing gas making fluids through 59, 61, 62 and/or 65 and the nozzles 64 in sufficient amounts to maintain the desired fluidization of the refractory solids. In other words, during the heating period which is now the producer gas make period, some air is introduced through 59 as well as through valve 14, whereas during the water gas make period the steam is introduced not only through valves 5 and 10 but also through valve 65. It will be understood that oxygen can also be introduced with the steam during the latter period through valve 61 and/or valve 7.

In conducting the operations as described in Example III it is not necessary to use the extremely fine size powdered fuel, nor is it necessary that the particles be all substantialy uniform in size as in other processes known in the art. On the contrary it helps to prevent an excessive concentration of combustible matter in the bottom zone of the bed and a corresponding deficiency of combustible solids in the upper zones thereof, when there is an appreciable spread in the range of particle size of the fuel fed to the generator. Higher velocities can be employed during the gas-making period when the fuel particles are of coarse size or coarse and fine, than when the fuel is finely powdered. Because of the time factor in heating fuel particles it is preferable that the maximum size of fuel particles fed to generator 1 during the run should be less than $\frac{1}{16}$ to $\frac{1}{8}$ according to the depth and density of bed and other variables; mixed sizes through $\frac{1}{16}$ inch screen is excellent in general.

*Example IV*

Gasifying powdered coal at approximately 25 to 35 pounds' gage pressure; intermittent operation making a long run using oxygen and steam. Referring to Figure 2 the operation is started substantially as in Example I, the refractory solids 50 are heated to a temperature of about 1950° F. by burning gaseous fuel admitted through valve 12 with air, admitted through valve 12-A, in contact with said solids; the velocity of the burning gases in generator 1 being such that solids 50 are completely fluidized, that is, they are in a mixing motion suspended in the gaseous stream. The products of combustion are discharged from the generator through offtake 15 and 17, 19, 20, 67, valve 68 and stack 69. After this heating operation is completed, superheated steam at 800° F. is supplied by opening valve 10, valve 7 supplying oxygen is opened and valves 4 and 5 are opened to supply the powdered coal, whereas valve 66 is opened as stack valve 68 is closed. Throughout the shift from heating period to gas making period the solids 50 are kept in a fluidized state in the generator. The amounts of total steam, oxygen and coal supplied are closely regulated; they are charged to the generator in chosen particular relative amounts. It is preferable that the superficial velocity of the fluids through the bed of solids be higher during the heating period than during the run period. Excess air is employed during the heating stage for the complete combustion of the fuel supplied during that stage. The gas made during the run passes out through offtake 15 and serially through 17, 19, 20, 67, 66, 18, valve 22, meter 23 and offtake 24. The pyrometers 32 and 41 are used to determine the temperature in the bed of solids and to judge the duration of the different phases of the cycle; when they show that the temperature during the run has decreased to about 1650° F. the run is discontinued and another heating period is initiated. In this and subsequent heating periods powdered fuel may be used instead of gas when so desired, the powdered coal for this purpose may be introduced through valve 4 or valve 35; some of the fuel burned during the heating period may be residue from the run period. Although it is difficult to give exact quantities and rates of supplying them to the generator because of variations in shape, density and size of the solids and other variables, approximate figures are presented with instructions for making any required adjustments, as follows, calculated for a bed depth of 30 feet and a diameter, about 1 foot above the grid, of 20 feet.

| | |
|---|---|
| Size of solids, diameter | $\frac{3}{16}$ to $\frac{1}{4}$ inch. |
| Specific gravity of solids | About 3.5. |
| Maximum bed density during the heating period; pounds per cu. ft. | About 70–90. |
| Maximum bed density during the gas making period; pounds per cu. ft. | About 80–100. |
| Pounds of refractory solids in the bed | 847,800. |
| Heat stored in solids above 1650° F. when solids are at 1950° F., B. t. u. | 64,430,000. |
| Temperature of oxygen supplied generator, °F | 800. |
| Temperature of steam supplied generator, °F | 800. |
| Temperature of coal supplied generator, °F | 220. |
| Bituminous coal (12,800 B. t. u. per lb.) consumed: | |
| (a) During run, per 1000 cu. ft. of gas made; lbs | 25.0. |
| (b) During heating, per 1000 cu. ft. of gas made; lbs | 5.0. |
| Steam reacted during run, pounds per 1000 cu. ft. of gas made | 12.5. |
| Steam supplied to generator during run, pounds per 1000 cu. ft. of gas made | 14.2. |
| Oxygen supplied during run (95%) per 1000 cu. ft. of gas made; cu. ft. | 150. |
| Mean temperature of offtake gas during gas making run, °F | 1700. |
| Heat removed from generator solids during run, per 1000 cu. ft. of gas made, B t. u. | 30,000. |
| Gas made per run, thousands cu. ft. | 2147. |
| Steam supplied per minute per sq. ft. area, lbs | 7.5. |
| Oxygen (95%) supplied per minute per sq. ft. area, cu. ft. | 79. |
| Gas made per minute of run, M C. F. | 165. |
| Duration of run period, minutes | 13. |
| Coal supplied generator during run, lbs | 53,700. |
| Coal supplied generator per minute during run, lbs | 4130. |
| Coal burned in generator during the heating period, total pounds | 10,000. |
| Coal burned in generator during the heating period, pounds per minute per sq. ft. grid area | 1.60. |
| Air to generator per minute, cu. ft. | 75,000. |
| Air to generator during complete heating period, cu. ft. | 1,500,000. |
| Duration of heating period, minutes | 20.0. |
| Complete cycle, minutes | 33.0. |
| Approximate gas-making capacity per hour, cu. ft. | 3,800,000. |

The coal requirements will vary according to the condition of the bed of fluidized refractory solids and the amount of blown over fuel in the effluent gases; no allowance was made above for losses of solid fuel in the offtake gases. The composition of the gas made during the run varies somewhat from the start to end of that period as the temperature of the solids 50, decreases. However, for the purpose of this example the composition will approximate the following:

| | Volume percent |
|---|---|
| $CO_2$ | 5.3 |
| $CO$ | 47.1 |
| $H_2$ | 44.5 |
| $CH_4$ | 1.9 |
| $N_2$ | 1.2 |
| | 100.0 |

Because of the extreme difficulty in maintaining smooth operation with a bed 30 feet high when all of the gas making fluids are introduced at the bottom of the bed of refractory solids, final adjustments should include the introduction of part of the oxygen and steam used during the run, at the intermediate level of the bed through valves 61 and 65 respectively, referring to Figure 2. Approximately 60 percent of the total steam and 70 per cent of the total oxygen used may advantageously be introduced at the bottom zone of the bed and the balance at the intermediate zone through bustle pipe 63 and nozzles 64. Under these conditions the temperature of the generator offtake gas will be about 1700° F. during the run. During this run period these amounts of steam plus oxygen introduced at the base of the generator are close to the minimum that can effectively be used. During the heating period one may introduce about 60 per cent to 70 per cent of the total air, at the bottom of the bed through valve 14 or valve 12–A and the balance through valve 59 and bustle pipe 63. As in previous examples the composition of the make gas, calorific value, and temperature in the fluidized bed are used as guides in adjusting operating variables. The make gas should be free of oxygen; if it contains free oxygen either the velocity of the fluids in the bottom half of the bed is too low or the amount of oxygen admitted through bustle pipe 63 during the run is too high and one or the other change or both should be made. The exact length of the run and the heating periods are determined by the temperature in the bed employing pyrometers. Corrections for blown over powdered fuel can be made in view of the fuel collected and discharged at the base of dust collector 18 through valve 39, and that discharged from the waste heat boiler 20 through valve 49.

The procedure described in the foregoing examples referring to Figures 1 and 2 is applicable also with reference to Figure 3. Since refractory solids larger than 1⁄8-inch are required for operations at temperatures of the order of 1950° to 2000° F. and because of the difficulty in controlling fluidization, bed density and slugging tendencies in a deep fluidized bed, means for minimizing these difficulties have been provided which include the separate supply lines for introducing fluids into the generator in a plurality of zones of different levels at high, separately controllable jet velocities. Referring to Figure 3, the 3 bustle pipes 83, 63 and 73, which supply fluids to the generator, function not only as a means of supplying such fluids, but to serve them under predetermined pressure in predetermined volumes so that the degree of mixing of the refractory solids is separately controllable in the different zones. The amount of back mixing of the latter solids may be so reduced by the use of these bustle-pipe supply lines that a difference of 100° to 300° F. temperature may prevail between the top and bottom of the bed during a steam-oxygen run, preferably the top is kept cooler. This temperature difference may be exceeded by limiting the amount of oxygen supplied through pipe 73. Before presenting another example attention is called to certain important features which collectively add materially to the smoothness of operations employing the generator of Figure 3 and large size refractory solids in a deep bed. The grid 2 should be arched with the crest in the middle; the nozzles 84 preferably should slope upwardly, inwardly radially; nozzles 64, the mixing-nozzles are preferably inclined upwardly, inwardly tangentially whereas nozzles 74 preferably slope upwardly inwardly substantially radially; the generator tapers, being of greater diameter at the top. The nozzles 84, 64 and 74 each have orifice plates so that a definite amount of fluid flows through each one for a given pressure differential. Nozzles 64 preferably are alternately relatively large and relatively small so that the quantity of fluid flowing through one of the 64 series is not the same as that flowing through adjacent nozzles in the same series.

*Example V*

Referring to Figure 3 and continuously making gas containing $H_2$ and CO, under superatmospheric pressure, employing refractory solids which are difficult to fluidize in a deep bed, employing superheated steam and preheated oxygen as gas-making fluids.

The fuel employed in this example is a bituminous coal of poor coking properties having a calorific value dry of 12,800 B. t. u. per pound crushed to pass through a 1⁄8-inch screen; the oxygen is 95 per cent pure oxygen. The operation is basically similar to that of Example I except that means are provided and used for dealing with refractory solids which are difficult to maintain in a suitable dense state of fluidization in depths over 20 feet. The procedure is as follows:

Starting with a bed of refractory solids having a specific gravity about 3.5 sized approximately 1⁄4 to 5⁄16-inch in diameter and about 10 feet deep, fuel gas admitted to the generator through valve 12 is burned in the bed with air admitted through valve 12–A, the velocity of these fluids or of the burning gas being sufficient to fluidize the solids in the bed, the combustion products are conducted from the genertaor through 15, 17, 19, 20, 67, valve 68 and stack 69. After the solids are heated to about 1350° F. additional solids are added and the bed depth is increased, additional air is introduced, through valve 59 and bustle pipe 63, and an additional amount of fuel gas is charged through valve 12. As the bed depth approaches the level L coal is introduced through valve 4 and an additional amount of air for its complete combustion is introduced; this air may be admitted through valve 79. The latter supply of air is used actually for burning combustible gas formed in the lower zones of the bed by action of oxygen and steam on the coal. After the deep bed of solids is heated to about 1700° F. the change is made from heating period to the continuous gas making period; this change may be made as follows: admit coal through valve 4 with steam through valve 5, partly open steam valve 85 and close air valve 12–A and fuel gas valve 12, and simultaneously open steam valve 10 and then oxygen valve 7, then open steam valve 85 fully, admit oxygen through valve 81, close air valves 59 and 79, open steam valves 65 and 75, open gas valve 66 and close stack valve 68. Meanwhile maintaining the bed in a fluidized state. Now the quantitites of oxygen, steam and coal supplied to the generator must be adjusted so that the bed is in a suitable state of fluidization and so that the exothermic and endothermic reactions are so balanced that a temperature in the bottom half of the bed will be about 1780° to 1950° F. and the top zone of the bed is lower than 1950° and preferably about 1700° F. The amount of coal fed must be in balance with the amount gasified as determined by the composition of the gas made and the rate of make indicated by the meter 23. It is desirable that oxygen and steam be introduced into generator 1 through bustle pipe 63 and also through bustle pipe 83 and it is also desirable that mixed oxygen and steam pass up through grid 2 during this gas-making period. Air is not admitted to the generator during the gas-making stage when chiefly CO and $H_2$ are the desired end products; for ammonia synthesis gas air may supplant some of the oxygen. The supply of mixed oxygen and steam beneath the grid 2 should be sufficient to fluidize a bed of the solids of the diameter just above the grid. The amount of mixed steam and oxygen admitted through bustle pipe 83 should be sufficient to break up tendency for slug formation in the region of the bed adjacent thereto, prevent settling of the solids in the adjacent zone of said bed and react with an appreciable portion of the coal particles in the bed at that level. The oxygen-steam mixture entering through bustle pipe 63 should be sufficient to thoroughly mix the solids in the zone adjacent and above it and largely consume the fuel particles rising to the level of bustle pipe 63 as well as maintain the temperature in the bed in this upper level at a suitable gas making temperature. Very little if any oxygen need be used through 71 and bustle pipe 73, because steam alone will be sufficient to gasify any carbonaceous fuel particles reaching the top zone of the bed. However, at very high gas-making capacities, namely, with high velocity of gas making fluids through the bed and/or when the coal particles are initially very fine it will be necessary to use some oxygen at the top zone admitting it through valve 71. The top zone of the bed should be kept in such a state of agitation that the ash particles pass out of the bed entrained in the gas; the fluids introduced through bustle pipe 73 are in part for this purpose. The refractory solids do not mix as completely or as fast from top to bottom of the bed when fluids are introduced in jets at a plurality of levels between the top and bottom of the bed as when all of the fluidizing medium is supplied at the bottom of the bed; hence it is desirable, for efficient operation, to regulate the relative amounts of steam and air supplied to those levels so as to maintain the desired temperature in the bed. Because of the tapering generator it will be found, when employing minimum fluidizing velocities in the bottom zone of the bed, that it is necessary to introduce additional fluid to keep the upper portions of the bed fluidized; this is accomplished by introducing fluids through the bustle pipes as described. The quantities of fluids admitted above the bottom zone depend to an appreciable extent upon the relative diameters of the top and bottom zones of the bed. With a bed having a diameter at about the level of the top of grid 2 of 20 feet has a diameter of 28 feet at the top thereof and the depth is 30 feet, it will be apparent that the volume of fluids flowing upwardly through the bed, other factors remaining constant, should be about twice as great at the top as at the bottom of said bed. In making combustible gas other factors are not constant, for example, the volume increases by reaction of oxygen with carbon forming carbon monoxide, by reaction of steam with carbon forming water gas, and also because of a decrease in pressure in the bed from bottom to top. Furthermore the gas density changes from bottom to top of the bed. The approximate quantities of fluids (oxygen and steam in this example) introduced into generator 1 during the gas making period are preferably approximately in the following ranges:

Through bottom zone of bed, per cent __55 to 70
Through 82, 83, and 84, per cent _____ 14 to 18
Through 62, 63, and 64, per cent _____ 12 to 16
Through 72, 73, and 74, per cent _____ 4 to 10

These proportions are approximate and apply to the particular bed 20 feet in diameter at the base and 28 feet at the top. It is essential that the solids in the bed be fluidized and not settled; the use of differential pressure gages to record the difference in pressure over a given depth or portion of the bed will indicate the condition of the bed. Although the top zone of the bed should be particularly well fluidized, partly by the supply of fluids through 73 and 74, it will be obvious that the latter fluids will be largely wasted unless there is sufficient carbon in the top zone to react therewith. This condition is controlled by adjusting the supply of fluids to the bottom half of the bed and the fineness of the fuel supplied; the finer the fuel size and/or the higher the rate of feed of fluids to the bottom half of the bed the greater the concentration of carbon in the top zone of the bed. The carbon concentration in the bed may vary from say 20 to 30 per cent in the bottom zone to about 2 to 5 per cent in the top zone. The relative amounts of oxygen and steam admitted at the various levels need not be identical; final adjustment is made on the basis of temperature in the bed and gas composition. The ratio of volume in cubic feet of pure oxygen supplied per unit of time, to the pounds of steam used therewith will be 10:1 to 12:1, and will vary in this range according to the heat in these fluids and in the coal as supplied to the generator. It is an economy to employ a high ratio in the supply of fluids to the bottom half of the bed, particularly to the bottom zone, than in the supply to upper zones. This economizes the overall use of oxygen, permits more steam to be used in the upper half of the bed and permits the maintenance of a lower temperature in the top zone of the bed. The ratio may be, for example, 11 to 1 in the supply to the bottom zone, 10 to 1 in the mixture introduced through 83 and 84, 8:1 to 10:1 in the mixture entering through 63 and 64 and less than 8 to 1 in the mixture entering through 73 and 74. Again, the temperature must be considered in making final adjustments. The make gas passing out of the generator should be free of oxygen. Any oxygen supplied to the top zone through 73 and 74 will burn the product gas to $CO_2$ and $H_2O$ unless there is sufficient carbon present in the top zone to offset this effect; for this reason it may be desirable, according to the carbon concentration in the top zone, to reduce the oxygen to steam ration much below 8 to 1. On the basis of a pressure beneath the grid of 45 pounds' gage during the gas making period the proportions and rates of feed to the bottom zone of the generator which may be used prior to final adjustments based on temperature in the bed are:

Oxygen (95%) per minute per square foot sectional area of bed above grid, cu. ft. measured at standard temperature and pressure _____ 86.0
Steam mixed with the oxygen, lbs_____ 7.4

While these amounts of oxygen and steam are introduced at the bottom zone the relative amounts added at the upper levels initially may be, for this particular size bed, as follows:

|  | 95% Oxygen, cu. ft. | Steam, Pounds |
|---|---|---|
| Through 83 and 84 | 16.0 | 1.6 |
| Through 63 and 64 | 13.0 | 1.3 |
| Through 73 and 74 | 4.4 | 0.4 |
| Oxygen and steam as above, to bottom zone | 33.4 | 3.3 |
|  | 86.0 | 7.4 |
|  | 119.4 | 10.7 |

These figures are for quantities supplied to the generator per minute per square foot of horizontal sectional area of the bed just above the grid which area is about 310 square feet in this instance.

It will be understood that a chosen concentration of solid fuel in the bed of refractory solids can be maintained by initially building it up to the optimum for a particular kind and size of fuel by controlling the rate of feed and then supplying the fuel at the rate it is consumed. The size of the fuel particles advantageously may be synchronized with the bed density, specific gravity of the refractory solids and the superficial velocity of the gasiform fluids in the bed. In other words, when the specific gravity of the refractory solids is great and minimum fluidizing fluid velocities obtain in the bed, the bed density is at a maximum and the fuel particles can advantageously be of fine size, say 60 to 200 mesh, whereas at higher velocities and refractory solids of lower density coarser size fuel may be used. Thus by adjusting size of fuel particles fed to the generator in relation to the density of the bed of refractory solids, which density is a function of fluid velocity and size and specific gravity of the latter solids, the relative concentration of combustible solids in the different zones at different levels of the bed is controllable. A concentration above about 15 per cent is normally desired in the bottom zone and less in the top zone than in the bottom zone.

Somewhat summarily it may be said one of the features believed to be new is the use of a bed of substantially uniformly sized, non-friable, dense solids confined in a generator as a deep bed at elevated temperatures as a medium through which a gaseous stream initially containing reactants is passed along with fine size solid fuel under such conditions that said dense solids are fluidized offering a mobile tortuous path for said stream and so hindering the upward passage of said fuel in said stream that it is substantially completely reacted with said reactants within said bed. It is believed to be new to separately introduce into said bed a plurality of streams of gasiform reactants adapted to react with carbon at a plurality of levels above the bottom of said bed, for the purpose of controlling the temperature, bed density, and carbon concentration in said bed. It is also believed to be new to promote attrition of the fuel being gasified in the generator, by the use of dense, non-friable, homogeneous solids of somewhat larger size and greater specific gravity than the fuel particles. Because of the appreciable increase in volume during the generation of combustible gas employing steam and oxygen to the bed as the gaseous reactants, it is not feasible to introduce such reactants at a plurality of levels above the grid, when operating at high capacity (high superficial velocity in the bottom zone of said bed) unless the bed has greater diameter at the top than at the bottom. The arched grid is of particular usefulness in the apparatus (generator) shown in Figure 3 because it causes more of the gasiform fluids passing through the grid to travel initially in the middle of the bed, thus coacting with the nozzles 84 which supply these fluids around the periphery of the bed, in causing mixing of the refractory solids. Because solids appear to behave in quite a different manner when fluidized at very high pressures, it is preferable in conducting reactions within the scope of this invention to operate between 20 and 1000 pounds' gage although higher pressures may be employed when special conditions require it. The fuel is preferably supplied to the generator at a temperature above about 220° F. The temperatures in the bed of refractory solids are maintained at about optimum for producing particular reactions; for water gas production the range is substantially 1650° to 2000° F. Other reactions are envisaged which are conducted to advantage at much lower temperatures. Employing a uniformly tapered generator as shown in Figure 3 the diameter of the bed should increase at about 0.8 to 1.5 per cent per foot height, preferably about 1.0 to 1.2 per cent per foot, for gasifying solid fuel with steam and/or oxygen.

Various modifications of operating procedure will become evident, to one skilled in the art, other than those given in the examples. Other oxidants than oxygen and steam may be used; carbon dioxide may replace some of the steam, air may replace all or some of the oxygen. Again hydrocarbon gases or vapors may be introduced along with steam when desired, for example, for the purpose of controlling the $H_2$ to CO ratio in the product gas. In view of the possible variations beyond the examples given, applicant desires that the invention be limited only by the claims.

Having described the invention so that one skilled in the art can practice it, I claim:

1. The process of promoting chemical reactions between gasiform reactant substances and finely divided solid combustible materials, such as finely divided mineral solid fuels, coke, and mixtures of them, comprising, passing a gasiform fluid stream initially containing at least one gasiform reactant and a finely divided comminuted solid fuel adapted to react chemically therewith, upwardly through a deep substantially stationary mass of small-size non-combustible refractory solids which are of larger size than said comminuted solid fuel, which solids are initially substantially uniformly sized being smaller than about ½-inch but larger than about $\tfrac{1}{16}$-inch mean diameter, and which solids are confined as a deep bed in a generator at an elevated temperature adapted to promote reaction of said fuel with said reactant, at such a velocity that said refractory solids are substantially densely fluidized and substantially continuously retained in said bed substantially in ebullient motion in said generator, thereby causing said reaction to occur with substantially complete consumption of said fuel in said stream in said generator as said stream passes by a mobile tortuous path upwardly through said bed while hindering the passage of said solid fuel particles through said bed, and removing the gaseous reaction products from said generator in said stream.

2. The process defined in claim 1 in which the refractory solids have a mean diameter greater than ⅛-inch and less than about ⅜-inch, in which the pressure in said generator while promoting said reaction is greater than atmospheric pressure and in which the said solid fuel is in powdered form as fed to said generator.

3. The process defined in claim 1 in which the temperature of said refractory solids is of the order of 1600° to 2000° F., the pressure in the bed in the generator while promoting said reaction is greater than atmospheric pressure, the size of the refractory solids is greater than ⅛-inch and less than ½-inch mean diameter and the fuel is a mineral solid fuel.

4. The process defined in claim 1 in which the relative rates of supplying the finely divided solid fuel and the reactants to the bed in said generator are such as to maintain a concentration of combustible solids in a zone of said bed below the middle thereof greater than about 15 per cent and less than about 30 per cent.

5. The process defined in claim 1 in which the pressure in said generator is greater than atmospheric, in which the said gasiform fluid stream initially contains a plurality of gaseous reactants each capable of reacting chemically with said finely divided solid fuel at said elevated temperature, and in which the rates of feed of the solid fuel and the stream of reactants are so controlled that said fuel is consumed in said bed substantially at the rate it is fed to the generator.

6. The process defined in claim 1 in which the said gasiform fluid stream is passed upwardly through said bed of small-size refractory solids from the bottom thereof, in which the temperature of said solids is maintained at least in part by promoting exothermic reactions in said fluid stream in said bed and in which the gasiform fluid stream initially contains both steam and oxygen at a temperature of the order of 800° F.

7. The process defined in claim 1 in which the said finely divided solid fuel is selected from the class consisting of lignite, sub-bituminous coal, bituminous coal, semi-bituminous coal, anthracite coal, oil shale, cannel coal and coke.

8. The process defined in claim 1 in which the refractory solids are considerably denser and less friable than the solid fuel and in which the said fuel is a powdered coal.

9. The process defined in claim 1 in which, the depth of said bed is of the order of 20 to 40 feet, the fluid stream initially comprises steam and free oxygen, the temperature in the bed of fluidized refractory solids is of the order of 1600° to 2000° F., the pressure in the generator is greater than atmospheric pressure, the mean diameter of the refractory solids is greater than $\frac{1}{8}$-inch and less than $\frac{1}{2}$-inch, the mean diameter of the solid fuel particles fed to the generator is less than $\frac{1}{8}$-inch and in which the amounts of oxygen and steam are proportioned to maintain the said temperature in said bed of refractory solids and the initial oxygen content of said stream is sufficient to maintain said temperature in said bed for a prolonged period of time.

10. The process defined in claim 1 in which, a portion of said fluid stream is introduced into said bed at substantially the bottom thereof and a second stream initially containing reactant fluid is introduced into a zone of said bed of greater diameter between the top and bottom thereof whereby the effluent stream of gasiform reaction products is substantially free of suspended solid fuel particles.

11. The process defined in claim 1 in which the rates of feed of said gasiform fluid and the solid fuel to the generator are so synchronized that the rate of travel of fuel particles upwardly in said bed is greatly retarded by virtue of the density of the bed of fluidized solids whereby the concentration of said fuel particles in the bed in a zone adjacent the bottom of said bed is in the approximate range 20 to 30 per cent.

12. The process defined in claim 1 in which said refractory solids are periodically fed to said bed in said generator while said fluid stream passes upwardly through said bed in amounts adapted to maintain a substantially uniform quantity of them in said bed, and in which the latter solids are periodically discharged from said bed while said fluid stream passes upwardly therethrough.

13. The process of promoting chemical reactions between gaseous reactant substances and finely divided solid combustible material making combustible gas, comprising, passing a gasiform fluid stream initially comprising a gasiform oxidizing agent adapted to oxidize solid fuel upwardly through a deep substantially stationary mass of small-size refractory incombustible solids, which solids are initially substantially uniformly sized being larger than about $\frac{1}{16}$-inch and smaller than about $\frac{1}{2}$-inch in diameter, and which solids are confined in a generator at an elevated gas-making temperature, at such a velocity that the said solids of said confined mass are substantially fluidized as a dense deep bed substantially continuously retained in said generator in ebullient motion, simultaneously introducing into said stream in said bed adjacent the bottom thereof a stream of comminuted solid fuel of smaller particle size than said refractory solids, reacting said fuel with said oxidizing agent in said fluid stream as the latter stream passes up through said bed in contact with the fluidized refractory solids and the fuel particles thereby making said gas, and removing the gaseous reaction products substantially as formed in said fluid stream from above said bed.

14. In the process defined in claim 13 the steps comprising, introducing the solid fuel into the bed of fluidized refractory solids in the generator at a level above the bottom thereof and introducing at least a large portion of said oxidizing agent into said bed at substantially the bottom thereof.

15. The process of promoting chemical reactions between gaseous reactant substances and finely divided solid combustible materials, making combustible gas, comprising, passing a gasiform fluid stream initially comprising a substantially powdered solid fuel and an oxidizing agent including steam and a lesser volume of free oxygen upwardly through a deep stationary mass of small-size refractory solids, which solids are initially substantially uniformly sized being larger than about $\frac{1}{16}$-inch and less than about $\frac{1}{2}$-inch mean diameter, and which solids are confined as a deep bed in a generator at an elevated gas-making temperature, at such a velocity that said solids are densely fluidized in said bed and retained substantially continuously in said generator in ebullient motion, thereby substantially completely gasifying said powdered fuel in said stream substantially in contact with the hot fluidized solids as said stream passes upwardly through said bed while simultaneously generating at least some of the heat required for gasification of said fuel by burning some of said solid fuel with said oxygen in said bed, and removing the reaction products in said stream from above said bed, said velocity being such that the latter stream is substantially free of entrainment of said solids as discharged from said generator.

16. The process of promoting chemical reactions and making combustible gas from solid fuel and an oxidizing agent adapted to react therewith at elevated temperature, comprising, heating a mass of incombustible, heat-resisting solids sized within the range $\frac{1}{8}$ to $\frac{1}{2}$-inch mean particle diameter, while it is confined in a generator, to a temperature of the order of 1800° to 2000° F. by burning fuel in contact with said solids while they are in a fluidized state in said generator, then generating combustible gas by passing a gasiform stream initially containing an oxidizing agent including steam and small-size particles of said solid fuel upwardly through the confined mass of thus heated solids at such a velocity that it is fluidized as a deep dense bed in said generator, reacting said particles of fuel with said oxidizing agent in said gasiform stream as it passes upwardly through said confined bed forming said combustible gas and removing the latter gas from said generator in said stream from above said bed.

17. The process defined in claim 16 in which said gasiform stream initially contains both steam and free oxygen as oxidizing agents and in which the ratio of said agents in said stream is less than about 11 cu. feet of oxygen to 1 pound of steam.

18. The process of promoting chemical reactions and making combustible gas by reaction of a gasiform reactant with a finely divided solid fuel at elevated temperatures, comprising, confining a stationary mass of incombustible refractory, substantially uniformly-sized homogeneous solids sized in the range $\frac{1}{8}$ to $\frac{9}{16}$ inch in diameter having a specific gravity of the order of 2.5 to 5.0 as a deep bed in a generator at a temperature of the order of 1600° to 2000° F., densely fluidizing said solids in ebullient motion as a deep bed in said generator and simultaneously making combustible gas by passing a stream initially comprising steam and oxygen upwardly through said bed at a superficial velocity of 2.0 to about 8.0 feet per second, while introducing into said stream in a portion of said bed below the middle but above the bottom thereof a comminuted solid fuel, whereby said fuel reacts chemically with said steam and oxygen forming a gaseous mixture containing CO and $H_2$ having a calorific value above about 129 B. t. u. per cubic foot, and removing said mixture from generator in said stream from above said bed, meanwhile so regulating the velocity of said stream in said bed that said refractory solids are retained in said generator substantially continuously.

19. The process of promoting chemical reactions and making combustible gas from solid fuel and an oxidizing agent adapted to react therewith at elevated temperatures, comprising, heating a mass of incombustible, heat-resisting solids sized within the range $\frac{1}{8}$ to $\frac{1}{2}$-inch mean particle diameter, while it is substantially continuously confined in a generator, to an elevated gas making temperature of the order of 1650° to 2000° F. by burning fuel in contact with said solids while they are in a densely fluidized state in said generator, then generating combustible gas by passing a gasiform stream, initially containing oxidizing agents including steam and free oxygen and small-size particles of said solid fuel, upwardly through the confined mass of thus heated solids at such a velocity that it is densely fluidized as a deep continuous bed in said generator, reacting said particles of fuel with said oxygen and steam in said stream as it passes upwardly through said confined bed forming said combustible gas and removing the latter gas from said generator in said stream from above said bed.

20. The process defined in claim 19 in which the ratio of oxygen to steam initially present in the gasiform stream is of the order of 10 cubic feet of oxygen per pound of steam.

21. The process defined in claim 19 in which the steam and oxygen are first premixed at a temperature above the dew point of steam and supplied to said bed under pressure above atmospheric.

22. The process defined in claim 19 in which the rate of feed of the coal particles to said bed is so controlled that their concentration in the bottom half of the bed is maintained greater than 15 per cent of the total fluidized solids in that half but less than about 30 per cent thereof.

23. The process defined in claim 19 in which hydrocarbon substance in a vaporous phase is so introduced into said bed in a zone above the bottom zone thereof that it reacts thermally in said bed, the reaction product passing out of said bed in said stream.

References Cited in the file of this patent

UNITED STATES PATENTS

| Number | Name | Date |
|---|---|---|
| 1,857,799 | Winkler | May 10, 1932 |
| 2,320,273 | Gohr et al. | May 25, 1943 |
| 2,353,495 | Payne | July 11, 1944 |
| 2,376,564 | Upham et al. | May 22, 1945 |
| 2,440,482 | Martin | Apr. 27, 1948 |
| 2,455,915 | Borcherding | Dec. 14, 1948 |
| 2,480,670 | Peck | Aug. 30, 1949 |
| 2,482,187 | Johnson | Sept. 20, 1949 |
| 2,538,219 | Welty | Jan. 16, 1951 |
| 2,592,377 | Barr | Apr. 8, 1952 |

FOREIGN PATENTS

| Number | Country | Date |
|---|---|---|
| 296,751 | Great Britain | Sept. 3, 1928 |
| 586,391 | Great Britain | Mar. 18, 1947 |
| 611,924 | Great Britain | Nov. 5, 1948 |

OTHER REFERENCES

Wilhelm et al.: "Chemical Engineering Progress," vol. 44, No. 3 (March 1948), pages 201-218.

Lange: "Handbook of Chemistry," 5th edition, pages 237-8, 1375.